United States Patent

Wellman, Jr.

[15] 3,675,170

[45] July 4, 1972

[54] MAGNETIC CLUTCH COUPLING FOR MONITORING SHAFT ROTATION

[72] Inventor: James W. Wellman, Jr., 1445 Brook Valley Place, Dallas, Tex. 75232

[22] Filed: Feb. 26, 1971

[21] Appl. No.: 119,228

[52] U.S. Cl. ...................... 335/207, 200/61.39, 200/153 N, 335/288
[51] Int. Cl. ........................................ H01h 3/40, H01h 3/42
[58] Field of Search .................. 200/61.39, 153 N; 335/207, 335/288

[56] References Cited

UNITED STATES PATENTS 2,718,567   9/1955   Elliot et al. .......................... 200/61.39

*Primary Examiner*—Roy N. Envall, Jr.
*Attorney*—Clarence A. O'Brien and Harvey B. Jacobson

[57] ABSTRACT

A wheel having permanent magnets therein is keyed to a rotatable shaft. A second wheel is positioned adjacent the first wheel and also includes a number of permanent magnets therein. The second mentioned wheel is driven by magnetic coupling when the shaft and the first mentioned wheel turns. Means are provided for sensing the rotation of the second or driven wheel which indicates direction of rotation for the shaft.

10 Claims, 7 Drawing Figures

Patented July 4, 1972

James W. Wellman, Jr.
INVENTOR.

BY Clarence A. O'Brien
and Harvey B. Jacobson
Attorneys

Patented July 4, 1972

James W. Wellman, Jr.
INVENTOR.

BY Clarence A. O'Brien
and Harvey B. Jacobson
Attorneys

3,675,170

MAGNETIC CLUTCH COUPLING FOR MONITORING SHAFT ROTATION

BACKGROUND OF THE INVENTION

The present invention relates to magnetic couplings and more particularly to a magnetic coupling having means for sensing the direction of rotational movement of a driven component.

Often times, it is desirable to determine the direction of machinery shaft rotation. Frequently, this information is derived by visually monitoring the shaft. However, as will be appreciated, this is a tedious and economically disadvantageous procedure. Although the prior art includes solutions for monitoring shaft rotation, the structures typically necessary are relatively complex thereby introducing high cost and unreliability factors.

SUMMARY OF THE INVENTION

The present invention is directed to a magnetic coupling and more particularly to a relatively simple and economically fabricated coupling which can be employed with conventional microswitches to automatically determine the direction of shaft rotation. In the construction of the present invention, odd and even numbers of permanent magnets are inserted in the driving and driven members of the magnetic coupling. As a result, it has been found that the system is quite responsive to small incremental angular changes in shaft rotation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
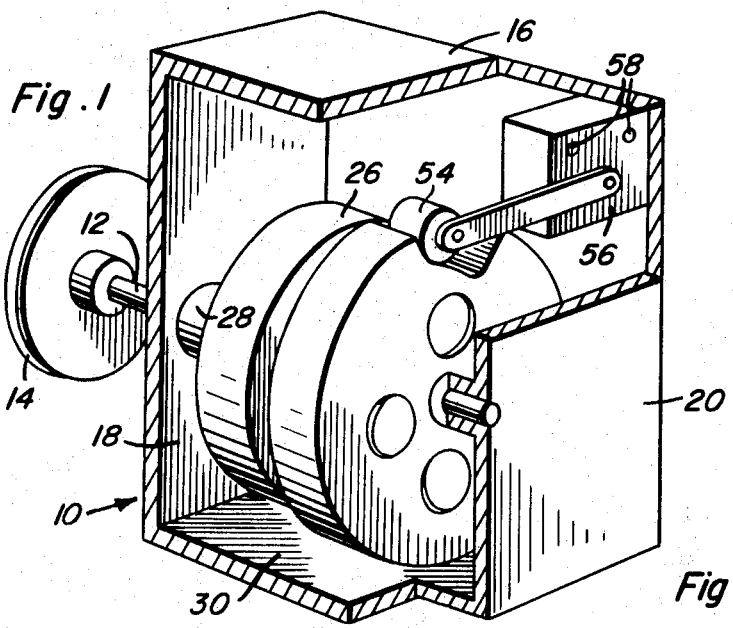
FIG. 1 is a cutaway view illustrating a preferred embodiment of the present invention within a housing.

At the outset, it should be mentioned that the preferred embodiment is particularly suited for detecting angular displacement of a shaft. The device is generally illustrated by reference numeral 10 and is seen to be mounted to a rotatable shaft 12 that is driven by a pulley wheel 14, gear or other motion translating member. The present device is directed to monitoring the direction of rotation of shaft 12. Toward this end, an assembly of components are housed within housing 16 having oppositely disposed spaced transverse walls 18 and 20.

Figure 2:
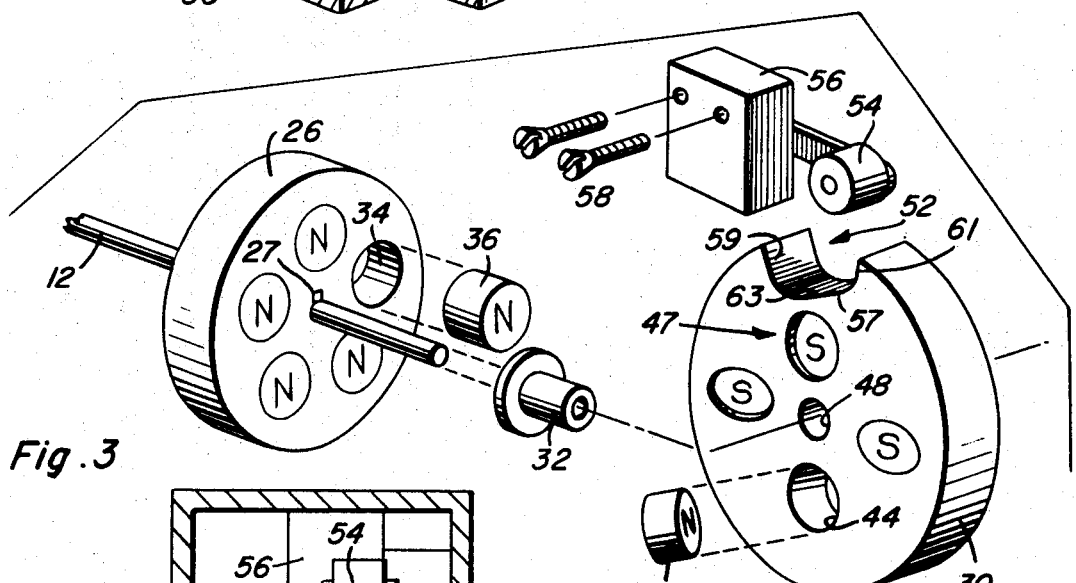
FIG. 2 is an exploded detail view illustrating the components of the assembly shown in FIG. 1.
Figure 3:
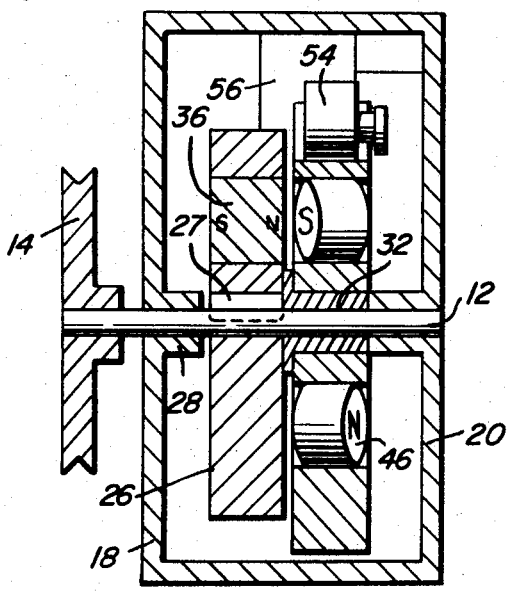
FIG. 3 is a vertical sectional view through the assembly illustrated in FIG. 1.

The magnetic coupling members, per se, are illustrated in FIG. 2. In this figure, a wheel 26 is seen to be centrally keyed (27) to shaft 12. The wheel is fabricated from a non-magnetic material, such as plastic. A boss element 28 extends inwardly from the transverse wall 18 and journals a left end portion of shaft 12. As the wheel 26 rotates it serves as a driving member for the magnetic coupling.

A driven member of the coupling can be characterized as a second wheel 30 fabricated from a non-magnetic material such as wheel 26. This wheel is mounted on but not keyed to shaft 12 as is the case with wheel 26 so that wheel 30 is free to rotate in magnetic response to rotation of the driving wheel 26. A headed bushing 32 is positioned on shaft 12 and pressed into wheel 30 at bore 48. The bushing 32 acts as a bearing and thrust washer. It spaces the wheels 26 and 30 from one another while allowing wheel 30 to rotate in response to magnetically induced torque.

Concerning the structure of the driving wheel 26, an odd number of bores 34 are formed in the wheel 26, the bores having axes that are parallel spaced from shaft 12. In the particular instance illustrated five bores are symmetrically formed at the same radial distance from shaft 12. Permanent magnets 36 are suitably secured within the bores 34. The outward ends of the magnets 36 are retained in flush relationship with respective surfaces of the wheel 26. As will be noted in FIG. 2 the magnets are arranged so that the opposite poles of each magnet are paired for maximum attraction or pulling power.

Figure 7:
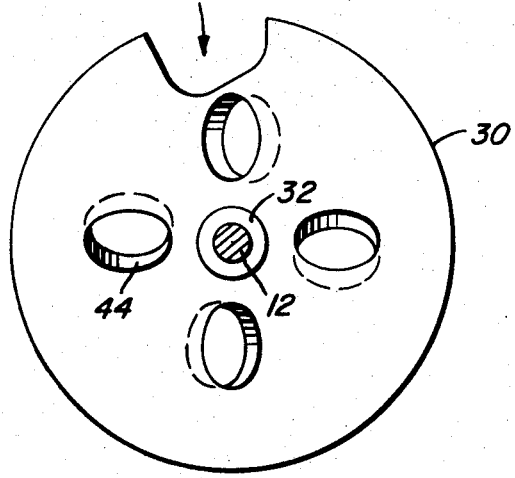
FIG. 7 is a side view of the driven wheel, illustrating the offset bores.

Bores 44 are formed in wheel 30 at radially equal distances from shaft 12. An even number of bores are included, which in the present instance number four. However, unlike the bores 34 in wheel 26, the bores 44 in wheel 30 do not have axes that are parallel to shaft 12. Rather, the axes of the bores 44 are formed at an angle to shaft 12 and in a plane parallel to the shaft, as shown in FIG. 7. Similar bar magnets 46 are inserted at equal distance and spacing about shaft 12, into bores 44 in wheel 30. By having one less (or one more) magnet in the driven wheel 30 than in the drive wheel 26, one set of magnets is almost always aligned and opposite each other thus wheel 30 moves almost instantly when wheel 26 turns.

Figure 4:
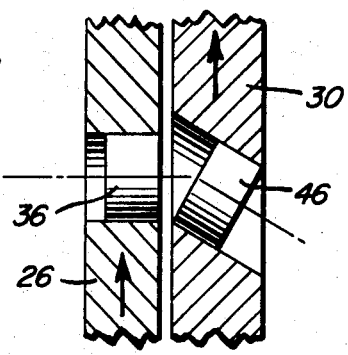
FIG. 4 is a cross-sectional view of a pair of aligned magnets.

FIG. 4 illustrates the interaction of the magnetic fields created by magnets 36 and 46. As driving wheel 26 is rotated in the direction of the arrow, the magnetic field of at least one of the magnets 36 overlaps that of at least one of the magnets 46. The magnets are attracted toward each other such that driven wheel 30 is rotated in the same direction as driving wheel 26. As the wheel 26 continues to rotate, wheel 30 reaches a stop position, as hereinafter explained, and one of the magnet pairs 36, 46 will become separated. At the same time, however, another pair of magnets will come into alignment with each other so as to maintain driven wheel 30 in its stop position.

Figure 5:
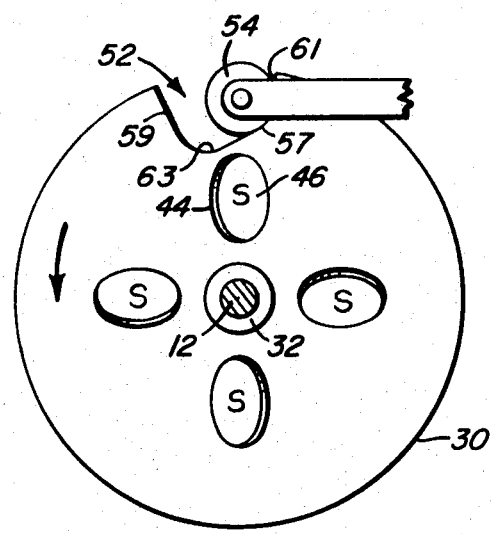
FIG. 5 is a side view of the cam and cam roller of microswitch with the driven wheel in the counter-clockwise position.
Figure 6:
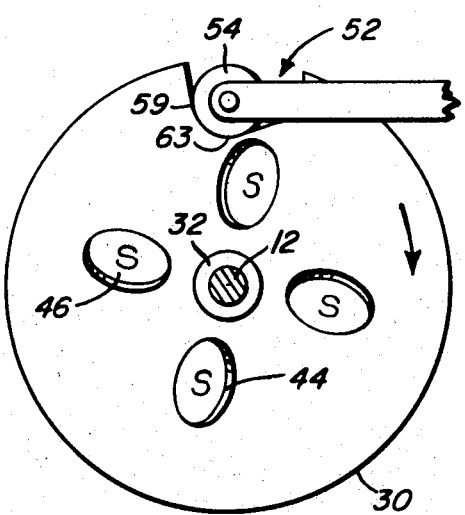
FIG. 6 is a side view of the cam and cam roller of the microswitch with the driven wheel in the clockwise position.

As shown in FIG. 5, a cam indentation 52 is formed in the peripheral edge of wheel 30. Thus, the wheel 30 serves as a cam against which roller 54 of a microswitch 56 rides. Threaded screws 58 secure the microswitch to transverse wall 20. As wheel 30 is driven in the counter-clockwise direction, downwardly biased cam roller 54 of microswitch 56 is forced up to cam stop 61. Cam surface 57 raises roller 54 which closes a first pair of contacts in microswitch 56 connected to a signaling device such as a light to indicate counter-clockwise rotation. This signals or indicates the direction of rotation of the machinery connected to the device. When the machinery is reversed, wheel 26 (FIG. 6) will travel in the opposite direction (i.e. clockwise), and roller 54, biased in the downward direction, will engage the lower cam surface 63 and cam stop 59 to open the first pair of contacts and close a second pair of contacts. This signals or indicates that the direction of rotation has been reversed.

It will be appreciated that the total number of magnets in each wheel may be varied as long as the even-odd relation is maintained. It should be noted that the canting of magnets 46 provides a magnetic field which covers a larger confronting area for intersecting the magnetic field of one of the magnets 36. This canting together with the odd-even relationship eliminates magnetic voids between wheels 26 and 30. Elimination of the magnetic voids assures an overlap of magnetic fields at some point between wheels 26 and 30. Accordingly, a movement of driving wheel 26 is almost instantly transmitted to driven wheel 30 to provide the desired signal indication. Thus, a relatively simple, yet highly reliable and highly sensitive device is provided to signal the direction of rotation of various pieces of machinery.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A device for monitoring shaft rotation comprising a rotatable shaft, a first member fixedly attached to said rotatable shaft for rotation therewith, a second member rotatably mounted in opposed confronting relation with said first member, sensing means operatively connected to said second member for signaling the direction of rotation of said shaft and said first member, and magnetic coupling means including a first plurality of magnets connected to said first member and a second plurality of magnets connected to said second member, each of said second plurality of magnets having outer surfaces periodically confronting surfaces of said first plurality of magnets as said first member is rotated, said outer surfaces being non-parallel to the confronting surface of said first plurality of magnets.

2. The device set forth in claim 1 wherein the total said first and said second pluralities of magnets is an odd number.

3. The device set forth in claim 1 wherein said first and second pluralities of magnets are each mounted the same radial distance from the rotational axis of said shaft.

4. The device set forth in claim 3 wherein each of said first plurality of magnets are equally spaced from each other, and each of said second plurality of magnets are equally spaced from each other.

5. The device set forth in claim 1 wherein said second member includes a peripheral surface with an indentation therein, and said sensing means includes a roller extending into said indentation for operation of a microswitch.

6. The device set forth in claim 5 wherein said indentation includes upper and lower cam surfaces whereby said roller engages said upper cam surface to signal rotation of said shaft in one direction and engages said lower cam surface to indicate rotation of said shaft in the opposite direction.

7. The device set forth in claim 6 wherein said second member includes stop means to prevent rotation of said second member beyond the points necessary for said roller to engage said upper and said lower cam surfaces.

8. The device set forth in claim 7 wherein said stop means includes a pair of radially extending walls in said indentation which engage said roller to prevent further rotation of said second member.

9. The device set forth in claim 1 wherein the outer surfaces of said second plurality of magnets are of opposite magnetic polarity as the confronting surfaces of said first plurality of magnets.

10. The device set forth in claim 1 wherein each of said outer surfaces of said second plurality of magnets is generally flat and lies in a plane angularly offset from a plane which is perpendicular to the axis of shaft rotation, the magnetic field of each of said second plurality of magnets being generally perpendicular to the associated outer surface.

* * * * *